United States Patent
Matsumura et al.

(10) Patent No.: US 12,297,312 B2
(45) Date of Patent: May 13, 2025

(54) CHLORINATED VINYL CHLORIDE-BASED RESIN

(71) Applicant: SEKISUI CHEMICAL CO., LTD., Osaka (JP)

(72) Inventors: Kenichi Matsumura, Yamaguchi (JP); Nozomi Eguchi, Yamaguchi (JP); Isao Higuchi, Osaka (JP); Yasunari Kusaka, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 341 days.

(21) Appl. No.: 17/908,757

(22) PCT Filed: Mar. 29, 2021

(86) PCT No.: PCT/JP2021/013348
§ 371 (c)(1),
(2) Date: Sep. 1, 2022

(87) PCT Pub. No.: WO2021/200844
PCT Pub. Date: Oct. 7, 2021

(65) Prior Publication Data
US 2023/0250201 A1   Aug. 10, 2023

(30) Foreign Application Priority Data
Mar. 31, 2020 (JP) .................. 2020-064539

(51) Int. Cl.
*C08F 8/22* (2006.01)
*C08F 8/34* (2006.01)
*C08F 114/06* (2006.01)

(52) U.S. Cl.
CPC ............. *C08F 8/22* (2013.01); *C08F 8/34* (2013.01); *C08F 114/06* (2013.01)

(58) Field of Classification Search
CPC ............... C08F 14/06; C08F 8/22; C08F 8/20
See application file for complete search history.

(56) References Cited

U.S. PATENT DOCUMENTS

2017/0183491 A1*   6/2017   Matsumura ......... C08K 5/1345

FOREIGN PATENT DOCUMENTS

| JP | 4-198349 | | 7/1992 |
| JP | 8-311286 | | 11/1996 |
| JP | 2015-013952 | * | 1/2015 |
| JP | 2015-13952 | | 1/2015 |

OTHER PUBLICATIONS

Yang, Plasma Processes and Polymers, vol. 13, Issue 3, Mar. 2016, p. 387-396 (Year: 2016).*
Translation of JP 2015-013952 (Year: 2015).*
International Search Report issued May 18, 2021 in International (PCT) Application No. PCT/JP2021/013348.

* cited by examiner

*Primary Examiner* — Robert C Boyle
(74) *Attorney, Agent, or Firm* — Wenderoth, Lind & Ponack, L.L.P.

(57) ABSTRACT

The present invention provides a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin. Provided is a chlorinated polyvinyl chloride resin having an average of a ratio (A/B) of a peak intensity A observed in a range of 300 to 340 $cm^{-1}$ to a peak intensity B observed in a range of 1,450 to 1,550 $cm^{-1}$ of 0.1 or more and 3.5 or less in Raman imaging measurement by Raman spectroscopy.

4 Claims, No Drawings

CHLORINATED VINYL CHLORIDE-BASED RESIN

TECHNICAL FIELD

The present invention relates to a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

BACKGROUND ART

Polyvinyl chloride resins generally have excellent mechanical strength, weather resistance, and chemical resistance, and thus have been processed into various molded articles and used in various fields.

Polyvinyl chloride resins, however, have poor heat resistance. This has led to the development of chlorinated polyvinyl chloride resins (CPVCs), which are polyvinyl chloride resins chlorinated to have improved heat resistance.

For example, Patent Literature 1 discloses a composition containing post-chlorinated polyvinyl chloride in combination with a specific stabilizer. Patent Literature 1 discloses that such a resin can withstand thermal stress and mechanical stress during processing.

CITATION LIST

Patent Literature
Patent Literature 1: JP H8-311286 A

SUMMARY OF INVENTION

Technical problem

However, a molded article (e.g., a pipe or a joint) obtained using the chlorinated polyvinyl chloride resin disclosed in Patent Literature 1 may not have sufficient adhesion strength especially when used in a form subjected to high pressure, and may be disconnected or cause water leakage.

Moreover, the obtained molded article may have low fusion strength at a spider portion when used as a pipe, or may have low fusion strength at a weld portion when used as a joint. Such a molded article thus may crack when used as a joint or the like.

In view of the above issues in the prior art, the present invention aims to provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

Solution to Problem

The present invention relates to a chlorinated polyvinyl chloride resin having an average of a ratio (A/B) of a peak intensity A observed in a range of 300 to 340 cm-1 to a peak intensity B observed in a range of 1,450 to 1,550 $cm^{-1}$ of 0.1 or more and 3.5 or less in Raman imaging measurement by Raman spectroscopy.

The present invention is described in detail below.

The chlorinated polyvinyl chloride resin of the present invention has an average of a ratio (A/B) of a peak intensity A observed in a range of 300 to 340 $cm^{-1}$ to a peak intensity B observed in a range of 1,450 to 1,550 $cm^{-1}$ of 0.1 or more and 3.5 or less in Raman imaging measurement by Raman spectroscopy.

When the average of the ratio (A/B) is within the above range, it is possible to produce a molded article that maintains high adhesion strength even when used in a form subjected to high pressure and is less susceptible to defects such as cracks due to insufficient strength. The lower limit of the average of the A/B is preferably 0.2, more preferably 0.3, still more preferably 0.5, further preferably 1.0, particularly preferably 2.0, especially preferably 3.0.

The average of the A/B is preferably less than 3.5, and the upper limit thereof is more preferably 3.0, still more preferably 2.5, further preferably 2.0, particularly preferably 1.5.

The average of the ratio (A/B) of the peak intensity A to the peak intensity B can be calculated by measuring Raman spectra using a micro-Raman spectrometer.

For the Raman spectrum measurement, the sample preparation method is not limited. Preferably, the method allows obtaining a Raman spectrum of only the chlorinated polyvinyl chloride resin.

Specifically, in an exemplary method, 150 parts by mass of an acrylic UV curable resin is added to 100 parts by mass of the chlorinated polyvinyl chloride resin. They were irradiated with ultraviolet light having a wavelength of about 375 nm at an intensity of 10 $mW/cm^2$ for three minutes to cure the acrylic UV curable resin, and then embedded in an epoxy resin to prepare a sample. The obtained sample is mechanically polished, and the resulting cross section is subjected to Raman imaging measurement using a micro-Raman spectrometer [embedding method]. In another exemplary method, the chlorinated polyvinyl chloride resin is dissolved in THF and put in a centrifuge to separate/filter out insoluble components from the solution. An excessive amount of methanol is then added for reprecipitation, and the precipitate is separated by suction filtration and dried in a vacuum drier at 80° C. The resulting sample is subjected to Raman imaging measurement using a micro-Raman spectrometer [THF precipitation method].

The obtained Raman imaging spectrum is baseline-corrected by linear approximation, and a peak intensity B observed in a range of 1,450 to 1,550 $cm^{-1}$ and a peak intensity A observed in a range of 300 to 340 $cm^{-1}$ are measured to calculate the A/B. The average for the peak intensities at 10,000 point is calculated to determine the average of the A/B.

The average can be measured using, for example, inVia Qontor (produced by Renishaw plc.).

The Raman imaging measurement is preferably performed after heating.

The temperature in the heating is preferably 100° C. or higher. Specifically, for example, the heating is preferably performed at 100° C., 110° C., 120° C., 130° C., 140° C., or 150° C., for example.

The heating time is preferably 5 minutes or longer. Specifically, the heating is preferably performed for 5 minutes, 10 minutes, 15 minutes, 20 minutes, 25 minutes, or 30 minutes, for example.

For measurement of a powdery chlorinated polyvinyl chloride resin, the sample is preferably prepared by the embedding method or the THF precipitation method, and heated at 150° C. for 10 minutes. For measurement of a molded article, an unheated sample prepared by the THF precipitation method is preferably measured.

In the chlorinated polyvinyl chloride resin of the present invention, a standard deviation of the ratio (A/B) of the peak intensity A observed in the range of 300 to 340 cm$^{-1}$ to the peak intensity B observed in the range of 1,450 to 1,550 cm$^{-1}$ is preferably 0.10 to 10.0 in the Raman measurement by Raman spectroscopy. Polyvinyl chloride resin (PVC), the raw material of the chlorinated polyvinyl chloride resin, has a particle size distribution and has variation in properties such as porosity and bulk specific gravity. Such variation causes a non-uniform chlorinated state, resulting in variation in the distribution of the degree of chlorination. In the present invention, when the standard deviation of the A/B is within the range, the chlorinated state can be considered uniform.

Therefore, when the standard deviation of the A/B is within the above range, it is possible to provide a molded article that enables the production of a molded article that maintains high adhesion strength even when used in a form subjected to high pressure and is less susceptible to defects such as cracks due to insufficient strength.

The standard deviation of the ratio (A/B) of the peak intensity A to the peak intensity B can be measured based on the peak intensity ratio obtained in the above Raman imaging measurement, for example.

The lower limit of the standard deviation of the A/B is more preferably 0.20, still more preferably 0.30, further preferably 0.40, particularly preferably 0.50, especially preferably 0.6, very preferably 0.8, particularly 1.0 or more, especially 3.0 or more, for example 5.0 or more.

The upper limit of the standard deviation of the A/B is more preferably 9.0, still more preferably 8.0, further preferably 7.0, particularly preferably 6.5, especially preferably 6.0, very preferably 5.5, particularly 5.0, especially 4.0, for example 3.0.

In the chlorinated polyvinyl chloride resin of the present invention, the average of the A/B and the standard deviation of the A/B preferably satisfy the following relation (1).

$$0.50 \}[\text{Average of A/B}] + [\text{Standard deviation of A/B}]^{1/2}\} 5.0 \quad (1)$$

When the relation is satisfied, it is possible to provide a molded article that enables the production of a molded article that maintains high adhesion strength even when used in a form subjected to high pressure and is less susceptible to defects such as cracks due to insufficient strength.

The chlorinated polyvinyl chloride resin of the present invention preferably contains structural units (a) to (c) represented by the following formulas (a) to (c). Preferably, the proportion of the structural unit (a) is 5.0 mol % or higher, the proportion of the structural unit (b) is 40.0 mol % or lower, and the proportion of the structural unit (c) is 55.0 mol % or lower, relative to the total number of moles of the structural units (a), (b), and (c). This allows the surface of the molded article to have better solvent-swellability when a polyvinyl chloride adhesive is used, thus improving adhesion strength. This also allows melting under heat to start earlier, which can improve fusion strength in a mold that has a portion where flows of molten resin join together during molding.

In the chlorinated polyvinyl chloride resin of the present invention, the proportion of the structural unit (a) is more preferably 30.0 mol % or higher, still more preferably 35.0 mol % or higher, and preferably 90.0 mol % or lower, more preferably 60.0 mol % or lower, relative to the total number of moles of the structural units (a), (b), and (c).

The proportion of the structural unit (b) is preferably 5.0 mol % or higher, more preferably 15.0 mol % or higher, and more preferably 30.0 mol % or lower, still more preferably 25.0 mol % or lower, relative to the total number of moles of the structural units (a), (b), and (c).

The proportion of the structural unit (c) is preferably 5.0 mol % or higher, more preferably 25.0 mol % or higher, and more preferably 55.0 mol % or lower, still more preferably 40.0 mol % or lower, relative to the total number of moles of the structural units (a), (b), and (c).

[Chem. 1]

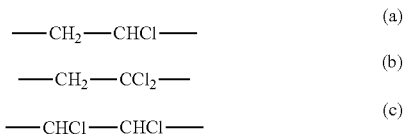

The molar ratios of the structural units (a), (b), and (c) in the chlorinated polyvinyl chloride resin of the present invention reflect the site to which chlorine is introduced at the time of chlorination of the polyvinyl chloride resin (PVC). The PVC prior to chlorination is in a state where the proportion of the structural unit (a) is 100 mols, and the proportions of the structural units (b) and (C) are 0 mols. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. The surface of the molded article can have better solvent-swellability when a polyvinyl chloride adhesive is used, thus improving adhesion strength. Moreover, melting under heat can start earlier, which can improve fusion strength in a mold that has a portion where flows of molten resin join together during molding.

The molar ratios of the structural units (a), (b), and (c) in the chlorinated polyvinyl chloride resin of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

The chlorinated polyvinyl chloride resin of the present invention may contain a different structural unit other than the structural units (a), (b), and (c) as long as the effects of the present invention are not impaired.

The amount of the different structural unit is preferably 0% by mass or more, and preferably less than 10% by mass.

Examples of the different structural unit include a structural unit having a sulfur-containing substituent. The chlorinated polyvinyl chloride resin particularly preferably contains a structural unit having a sulfur-containing substituent.

In the chlorinated polyvinyl chloride resin of the present invention, a sulfur content (described later) of the chlorinated polyvinyl chloride resin of 0 mass ppm or more indicates that sulfur is present in the resin and that the sulfur is bound to the resin. This shows that the chlorinated polyvinyl chloride resin of the present invention has a sulfur-containing substituent.

Examples of the sulfur-containing substituent include substituents derived from sulfur compounds. Examples of the sulfur compounds include compounds described later. Preferred among these is at least one thioglycolic acid compound selected from the group consisting of thioglycolic acid and a thioglycolic acid ester.

Examples of the structural unit having a sulfur-containing substituent include a structural unit (d) represented by the following formula (d).

R in the structural unit (d) is preferably a group to which is bound at least one selected from the group consisting of an alkylene group, an ester group, an alkyl group, and a thiol group, more preferably a group to which is bound at least one selected from the group consisting of an alkylene group, an ester group, and an alkyl group.

[Chem. 2]

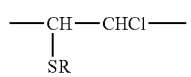

(d)

The chlorinated polyvinyl chloride resin of the present invention preferably has a sulfur content of 1 mass ppm or more and 1,000 mass ppm or less. The sulfur content is more preferably 5 mass ppm or more and 500 mass ppm or less. The sulfur content is still more preferably 10 mass ppm or more and 200 mass ppm or less.

The sulfur content in the chlorinated polyvinyl chloride resin can be determined by quantitative analysis using ion chromatography (IC). Specifically, the chlorinated polyvinyl chloride resin is dissolved in THF and put in a centrifuge to separate/filter out insoluble components from the solution. An excessive amount of methanol is then added for reprecipitation, and the precipitate is separated by suction filtration and dried in a vacuum drier at 80° C. The resulting sample is weighed in a ceramic boat and then burned in an automatic sample combustion device. The generated gas is captured in 10 mL of an absorber liquid. This absorber liquid is adjusted to 15 mL with ultrapure water, and subjected to IC quantitative analysis. For example, an automatic combustion device (produced by Mitsubishi Chemical Analytech, AQF-2100H) and an IC (produced by Thermo Fisher Scientific, ICS-5000) are used for measurement. Thus, the sulfur content (mass ppm) of the chlorinated polyvinyl chloride resin can be quantified.

In the chlorinated polyvinyl chloride resin of the present invention, the amount of added chlorine is preferably 1.0% by mass or more and is preferably 16.0% by mass or less.

When the amount of added chlorine is 1.0% by mass or more, a molded article to be obtained has sufficient heat resistance. When the amount of added chlorine is 16.0% by mass or less, moldability is improved.

The amount of added chlorine is more preferably 3.2% by mass or more, still more preferably 6.2% by mass or more. The amount is more preferably 15.2% by mass or less, still more preferably 12.2% by mass or less.

A polyvinyl chloride resin typically has a chlorine content of 56.8% by mass. The amount of added chlorine means the proportion of chlorine introduced into a polyvinyl chloride resin, and can be measured by the method specified in JIS K 7229.

In the chlorinated polyvinyl chloride resin of the present invention, the amount of added chlorine and the average of the A/B preferably satisfy the following relation.

0.1}[Amount of added chlorine (% by mass)]/[Average of A/B]≤160  (2)

When the above relation is satisfied, the chlorinated polyvinyl chloride resin has high uniformity, making it possible to obtain a molded article that enables the production of a molded article that maintains high adhesion strength even when used in a form subjected to high pressure and is less susceptible to defects such as cracks due to insufficient strength. From the same standpoint, the lower limit value in the relation (2) is more preferably 1.0, still more preferably 2.0, further preferably 2.5, and the upper limit value therein is more preferably 100, still more preferably 80, further preferably 65.

In the chlorinated polyvinyl chloride resin of the present invention, the amount of added chlorine and the average of the A/B preferably satisfy the following relation (3).

$2\times10^{-4}$ {[Average of A/B]/[[Amount of added chlorine]×[Proportion of structural unit b (%)]])≤2  (3)

When the above relation is satisfied, the chlorinated polyvinyl chloride resin has high uniformity, making it possible to obtain a molded article that enables the production of a molded article that maintains high adhesion strength even when used in a form subjected to high pressure and is less susceptible to defects such as cracks due to insufficient strength.

From the same standpoint, the lower limit value in the relation (3) is more preferably 0.0003, still more preferably 0.0004, further preferably 0.001, and the upper limit value therein is more preferably 1.0, still more preferably 0.1, further preferably 0.05.

The degree of polymerization of the chlorinated polyvinyl chloride resin of the present invention is preferably 100 or higher, more preferably 400 or higher, still more preferably 500 or higher. The degree of polymerization is preferably 2,000 or lower, more preferably 1,500 or lower.

When the degree of polymerization is within the above range, fluidity in molding and the strength of the molded article can both be achieved.

The chlorinated polyvinyl chloride resin of the present invention may be produced by, for example, a method including preparing a suspension in a reaction vessel by suspending a polyvinyl chloride resin in an aqueous medium, introducing chlorine into the reaction vessel, and heating the suspension to chlorinate the polyvinyl chloride resin (chlorination step).

In particular, the chlorinated polyvinyl chloride resin having an average of the ratio (A/B) of the peak intensity A observed in a range of 300 to 340 cm$^{-1}$ to the peak intensity B observed in a range of 1,450 to 1,550 cm$^{-1}$ of 0.1 or more and 3.5 or less in the Raman imaging measurement can be produced by adjusting the method, the reaction temperature, the reaction pressure, and the average chlorine consumption rate for the chlorination step, and adding the sulfur compound after the chlorination step. The chlorinated polyvinyl chloride resin also can be produced by adjusting the amount of the sulfur compound added, controlling the drying temperature and the drying time in the drying step, and adjusting the amount of added chlorine in the chlorinated polyvinyl chloride resin and the proportion of the structural unit (b) to the total number of moles of the structural units (a), (b), and (c).

The reaction vessel used may be a commonly used vessel such as a glass-lined stainless steel reaction vessel or titanium reaction vessel, for example.

The method of preparing the suspension of the polyvinyl chloride resin in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

While the reaction pressure (gauge pressure in the reaction vessel) in the chlorination step is not limited, it is preferably from 0 to 2 MPa, more preferably from 0.01 to 1.5 MPa because the higher the chlorine pressure is, the more readily the chlorine will penetrate into the PVC particles.

The method of chlorinating the PVC in the suspended state is not limited. Examples of chlorination method include a method in which light energy such as ultraviolet light is applied to accelerate chlorination by photoreaction (hereinafter referred to as photo-chlorination). The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

The photo-chlorination can provide a chlorinated polyvinyl chloride resin that enables the production of a molded article that has excellent gloss as well as high heat resistance and high mechanical strength.

During the chlorination, it is preferred to perform chlorination at an average chlorine consumption rate of 0.010 to 0.015 kg/PVC-Kg·5 min after the amount of added chlorine reaches a value that is five percentage points by mass lower than the final amount of added chlorine, and further perform chlorination at an average chlorine consumption rate of 0.005 to 0.010 kg/PVC-Kg·5 min after the amount of added chlorine reaches a value that is three percentage points by mass lower than the final amount of added chlorine. As used herein, the term "average chlorine consumption rate" refers to the amount of chlorine consumed in 5 minutes per kilogram of the raw material PVC.

When chlorination is performed using the above method, a CPVC having less nonuniformity in the chlorinated state and having excellent thermal stability can be obtained.

In the chlorination method, the concentration of the chlorine introduced into the reaction vessel is preferably 99.5% or higher.

For production of the chlorinated polyvinyl chloride resin of the present invention, a sulfur compound is preferably added after the chlorination step.

The chlorination step is typically followed by a neutralizing step, a washing step, a dehydrating step, and a drying step in sequence. The step of adding a sulfur compound is preferably performed during or after the dehydrating step. The sulfur compound may be added all at once or in multiple portions. The sulfur compound may be added as is, or may be diluted in a solvent such as water before being added.

Adding a sulfur compound causes addition reaction of the sulfur compound to replace the chlorine that is released from the main chain of the chlorinated polyvinyl chloride resin in the subsequent drying step. As a result, the dehydrochlorination amount during molding is reduced, and thus thermal stability is improved.

The sulfur compound is preferably an organic sulfur compound. Specific examples thereof include thioglycolic acid compounds, thiourea, thioglycerin, thioacetic acid, potassium thioacetate, thiodiacetic acid, thiosemicarbazide, and thioacetamide.

In particular, the sulfur compound is more preferably at least one thioglycolic acid compound selected from the group consisting of thioglycolic acid and a thioglycolic acid ester.

The thioglycolic acid encompasses not only thioglycolic acid but also thioglycolic acid salts such as metal salts, ammonium salts, and amine salts of thioglycolic acid.

Examples of the thioglycolic acid salts include sodium thioglycolate, calcium thioglycolate, ammonium thioglycolate, methylamine thioglycolate, ethylamine thioglycolate, monoethanolamine thioglycolate, diethanolamine thioglycolate, and triethanolamine thioglycolate.

Examples of the thioglycolic acid ester include thioglycolic acid alkyl esters such as methyl thioglycolate, ethyl thioglycolate, n-butyl thioglycolate, t-butyl thioglycolate, 2-ethylhexyl thioglycolate, octyl thioglycolate, isooctyl thioglycolate, decyl thioglycolate, and dodecyl thioglycolate. Also usable is an ester of thioglycolic acid with a hydrocarbon containing an alkoxy group, such as methoxybutyl thioglycolate. Preferred among these are 2-ethylhexyl thioglycolate and isooctyl thioglycolate.

Examples of the thioglycolic acid ester further include an alkanediol dithioglycolate which is a thioglycolic acid ester of an alkanediol, an alkanepolyol polythioglycolate which is a thioglycolic acid ester of an alkanepolyol, and polyalkylene glycol dithioglycolate which is a thioglycolic acid ester of polyalkylene glycol.

Examples of the alkanediol dithioglycolate include ethylene glycol bisthioglycolate, butanediol bisthioglycolate, neopentylglycol bisthioglycolate, and hexanediol bisthioglycolate. Preferred among these is butanediol bisthioglycolate.

Examples of the alkanepolyol polythioglycolate include trimethylolpropane tris(thioglycolate), pentaerythritol tris(thioglycolate), pentaerythritol tetrakis(thioglycolate), and dipentaerythritol hexa (thioglycolate).

Examples of the polyalkylene glycol dithioglycolate include diethylene glycol dithioglycolate.

The thioglycolic acid compound is preferably a compound represented by $HSCH_2COOR$ (wherein R is H or an alkyl group). The alkyl group has a carbon number of preferably 1 to 8.

In the production method, the lower limit of the amount of the sulfur compound added relative to 100 parts by mass of the chlorinated polyvinyl chloride resin is preferably 0.001 parts by mass, and the upper limit thereof is preferably 10 parts by mass. Adding the sulfur compound in an amount within the above range makes it possible to obtain the chlorinated polyvinyl chloride resin of the present invention. The lower limit is more preferably 0.002 parts by mass, still more preferably 0.005 parts by mass. The upper limit is more preferably 5 parts by mass, still more preferably 1.5 parts by mass, further preferably 1 part by mass, particularly preferably 0.5 parts by mass.

The sulfur compound may be added by any method, and is preferably added at an addition rate of 20 to 500 g/min.

The drying temperature after adding the sulfur compound is preferably 60° C. to 120° C. The drying time is preferably 6 to 48 hours. The drying temperature and the drying time within the above ranges promote the addition reaction of the sulfur compound. Examples of the drying method include stationary drying, hot-air drying, fan drying, far infrared heat drying, and vacuum drying.

A molded article can be produced by molding a resin composition for molding containing the chlorinated polyvinyl chloride resin of the present invention.

The present invention also encompasses a resin composition for molding containing the chlorinated polyvinyl chloride resin of the present invention.

The lower limit of the amount of the chlorinated polyvinyl chloride resin of the present invention in the resin composition for molding of the present invention is preferably 65% by mass, more preferably 70% by mass, and the upper limit thereof is preferably 96% by mass, more preferably 93% by mass.

The resin composition for molding of the present invention may optionally contain additives such as stabilizers, lubricants, processing aids, impact resistance modifiers, heat resistance improvers, antioxidants, ultraviolet absorbents, light stabilizers, fillers, thermoplastic elastomers, pigments, and reinforcement materials.

Examples of the stabilizers include, but are not limited to, thermal stabilizers and thermal stabilization aids. Examples of the thermal stabilizers include, but are not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

Examples of the thermal stabilization aids include, but are not limited to, epoxidized soybean oil, phosphate, polyol, hydrotalcite, and zeolite. These may be used singly or in combination of two or more thereof.

Examples of the lubricants include internal lubricants and external lubricants.

The internal lubricants are used to reduce the fluid viscosity of the molten resin in molding to prevent the generation of frictional heat. Examples of the internal lubricants include, but are not limited to, butyl stearate, lauryl alcohol, stearyl alcohol, epoxidized soybean oil, glycerol monostearate, stearic acid, and bisamide. These may be used singly or in combinations of two or more.

The external lubricants are used to improve the slip effect between metal surfaces and the molten resin in molding. Examples of the external lubricants include, but are not limited to, paraffin wax, polyolefin waxes, ester waxes, and montanic acid wax. These may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact resistance modifiers include, but are not limited to, methyl methacrylate-butadiene-styrene copolymers (MBS), chlorinated polyethylene, and acrylic rubber.

Examples of the heat resistance improvers include, but are not limited to, α-methylstyrene resins and N-phenylmaleimide resins.

The lower limit of the amount of the impact resistance modifier in the resin composition for molding of the present invention is preferably 1% by mass, more preferably 2% by mass, and the upper limit thereof is preferably 30% by mass, more preferably 15% by mass. The impact resistance modifier in an amount in the above range can sufficiently increase the strength of the resulting molded article.

Examples of the antioxidants include, but are not limited to, phenolic antioxidants.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the fillers include, but are not limited to, calcium carbonate and talc.

Examples of the pigments include, but are not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

Examples of the reinforcement materials include, but are not limited to, fiber reinforcement materials and non-fiber reinforcement materials. Examples of fiber reinforcement materials include glass fibers, carbon fibers, aramid fibers, polyethylene terephthalate fibers, cellulose nanofibers (CNF), and kenaf. Examples of non-fiber reinforcement materials include graphite and graphene.

Moreover, a molded article molded from the resin composition for molding of the present invention is provided. The present invention also encompasses such a molded article.

Here, for the molded article of the present invention, the chlorinated polyvinyl chloride resin in the molded article can be extracted with an organic solvent or the like to measure the chlorinated polyvinyl chloride resin having an average of the ratio (A/B) of the peak intensity A observed in a range of 300 to 340 cm$^{-a}$ to the peak intensity B observed in a range of 1,450 to 1,550 cm$^{-1}$ of 0.1 or more and 3.5 or less in the Raman imaging measurement.

The molded article may contain a reinforcement material such as glass fiber or carbon fiber.

The molding method may be any conventionally known molding method, for example, extrusion molding or injection molding.

The molded article of the present invention has excellent thermal stability and good appearance. The molded article of the present invention can therefore be suitably used in applications such as building components, plumbing materials and equipment, and housing materials.

It is known that, if conventional members of transportation machinery or battery systems are faultily manufactured or inappropriately used, the battery cells may ignite. As the capacity of battery cells has been increased to meet the demand for more convenience such as extension of cruise mileage, the risk of ignition is increasing. Nowadays, battery systems for transportation machinery are often mounted at places near crew members, such as vehicle compartments. With conventional safety measures, it is difficult to ensure sufficient evacuation time (about five minutes) for crew members in the event of ignition. Thus, new safety measures are awaited.

Conventional battery pack covers are made from iron. To meet the demand for reducing the weight, replacing iron with aluminum or resin is suggested. However, if battery cells in battery systems ignite, aluminum or resin covers cannot prevent flame and smoke from occurring. Measures to take for this issue are also necessary.

With regard to battery packs having a lower face reinforced with metal, the inner temperature of such battery packs rises when the transportation machinery makes contact with flame from a road, possibly causing thermal runaway of the cells and ignition. It is therefore necessary to prevent fire from penetrating into the battery packs and prevent an increase in the temperature inside the battery packs. Fuel cell vehicles are equipped with a hydrogen tank which has a risk of explosion, and thus measures to deal with external flames are also necessary. Moreover, with miniaturization and the reduction of weight of hydrogen tanks for space expansion of vehicle compartments or free layout design, if the number of equipped hydrogen tanks is increased, the parts possibly to contact fire may not be identified. Thus, covers to enclose the entirety of a battery pack or a hydrogen tank also need measures against heat or ignition.

The present invention can provide a molded article having high heat resistance, high flame retardancy, excellent impact resistance, excellent chemical resistance, and excellent transparency. The molded article can suitably be used as a member of transportation machinery or battery systems.

Examples of the transportation machinery include automobiles such as gasoline-powered vehicles, hybrid vehicles, electric vehicles, and fuel cell vehicles; motorcycles such as gasoline-powered motorcycles, hybrid motorcycles, and electric motorcycles; bicycles such as power assisted bicycles; railway vehicles; vessels; and aircraft.

Examples of the member of transportation machinery include mechanism members, interior members, exterior members, glass, and light covers.

Examples of the mechanism members include cooling pipes, air bag covers, air ducts, and heater units.

Examples of the interior members include ceiling, instrument panels, console boxes, arm rests, seat belt buckles, switches, and door trims.

Examples of the exterior members include emblems, number plate housings, bumper cores, and under covers.

Examples of the battery systems include primary batteries such as nickel manganese batteries, lithium batteries, and zinc-air batteries; secondary batteries such as nickel hydrogen batteries, lithium-ion batteries, and lead storage batteries; solar cells such as silicon solar cells, dye-sensitized solar cells, and perovskite solar cells; and fuel cells such as solid polymer fuel cells, alkali fuel cells, phosphoric acid fuel cells, and solid oxide fuel cells.

Examples of the member of battery systems include battery cases, battery cooling water jackets, hydrogen tank covers, connectors, and insulation sheets.

Advantageous Effects of Invention

The present invention can provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

DESCRIPTION OF EMBODIMENTS

The present invention is hereinafter described in more detail with reference to examples; however, the present invention should not be limited to these examples.

Example 1

A glass-lined reaction vessel having an inner capacity of 300 L was charged with 130 kg of deionized water and 50 kg of a polyvinyl chloride resin having an average degree of polymerization of 1,000. They were stirred to disperse the polyvinyl chloride resin in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, with stirring, chlorine (oxygen content 50 ppm) was introduced at a partial pressure of chlorine of 0.04 MPa, and the suspension was irradiated with ultraviolet light having a wavelength of 365 nm at an irradiation intensity of 160 W using a high-pressure mercury lamp, thereby starting chlorination reaction.

Then, the chlorination temperature was kept at 70° C., the partial pressure of chlorine was kept at 0.04 MPa, and the average chlorine consumption rate was adjusted to 0.02 kg/PVC-kg·5 min. When the amount of added chlorine reached 9.5% by mass, the ultraviolet irradiation using the high-pressure mercury lamp and the chlorine gas supply were terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, and dehydrated in a centrifuge (produced by Tanabe Tekkosho K. K., 0-15 model) for three minutes.

After dehydration, 0.1 parts by mass (0.05 kg) of 2-ethylhexyl thioglycolate (produced by FUJIFILM Wako Pure Chemical Corporation) as a sulfur compound was added to 100 parts by mass (50 kg) of the chlorinated polyvinyl chloride resin at 200 g/min. This was followed by stationary drying at 90° C. for 12 hours. Thus, a powdery, photochlorinated polyvinyl chloride resin (amount of added chlorine: 9.5% by mass) was obtained.

Comparative Example 1

A glass-lined reaction vessel having an inner capacity of 300 L was charged with 130 kg of deionized water and 50 kg of a polyvinyl chloride resin having an average degree of polymerization of 1,000. They were stirred to disperse the polyvinyl chloride resin in water to prepare an aqueous suspension, and then the inside of the reaction vessel was heated to raise the temperature of the aqueous suspension to 140° C. Subsequently, the inside of the reaction vessel was depressurized to remove oxygen (oxygen content 100 ppm). Thereafter, with stirring, chlorine (oxygen content 50 ppm) was introduced at a partial pressure of chlorine of 0.04 MPa, thereby starting thermal chlorination.

Then, the chlorination temperature was kept at 140° C. and the partial pressure of chlorine was kept at 0.40 MPa.

After the amount of added chlorine reached 4.4% by mass, addition of a 200 ppm hydrogen peroxide solution was started at 15 ppm/Hr in terms of hydrogen peroxide relative to the polyvinyl chloride resin, and the average chlorine consumption rate was adjusted to 0.05 kg/PVC-kg·5 min. When the amount of added chlorine reached 9.5% by mass, the supply of hydrogen peroxide solution and chlorine gas was terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, and dehydrated in a centrifuge (produced by Tanabe Tekkosho K. K., 0-15 model) for three minutes. This was followed by stationary drying at 90° C. for 12 hours. Thus, a powdery, thermally chlorinated polyvinyl chloride resin (amount of added chlorine: 9.5% by mass) was obtained.

Examples 2 to 15 and Comparative Examples 2 and 3

A powdery chlorinated polyvinyl chloride resin was obtained as in Example 1 except that chlorination was performed at the reaction temperature, reaction pressure, average chlorine consumption rate (upper value in each cell in the table: the rate after the amount of added chlorine reached five percentage points by mass from the final amount of added chlorine; lower value: the rate after the amount of added chlorine reached three percentage points by mass from the final amount of added chlorine) as shown in Table 1, then a sulfur compound was added in the shown amount, and drying was performed at the shown drying temperature for the shown drying time.

Comparative Example 4

A powdery chlorinated polyvinyl chloride resin was obtained as in Comparative Example 1 except that chlorination was performed at the average chlorine consumption rate shown in Table 1 and then drying was performed at the shown drying temperature and the shown drying time.

Example 16

A chlorinated polyvinyl chloride resin (amount of added chlorine 10.7% by mass) was obtained as in Example 3 except that the sulfur compound was added in the amount shown in Table 1 and drying was performed at 100° C. for 45 hours using a vibrating fluidized bed dryer (produced by Chuo Kakohki Co., Ltd., VU-75 model).

(Evaluation)

The chlorinated polyvinyl chloride resins obtained in the examples and the comparative examples were evaluated as follows. Table 1 shows the results.

(1) Raman Imaging Measurement

An amount of 300 parts by mass of THE was added to 10 parts by mass of each of the powdery chlorinated polyvinyl chloride resins obtained in Examples 1 to 16 and Comparative Examples 1 to 4, stirred for 24 hours for dissolution, followed by further stirring in a centrifuge (produced by Kokusan Co., Ltd., H-200NR) at 14,000 rpm for 1 hour to precipitate insoluble components. The insoluble components were filtered out, and to the filtrate was added 1,000 parts by mass of methanol to reprecipitate the resin. While the resin was washed with methanol, suction filtration was performed using an aspirator (produced by AS ONE Corporation, GAS-IN) to separate the resin from the filtrate. The obtained resin was put in a vacuum drier (produced by Tokyo Rikakikai Co., Ltd., VOS-451SD) and dried at 80° C. for 24 hours to prepare a sample. The sample was heated in a gear oven (produced by Toyo Seiki Seisaku-Sho, Ltd., CO—O2) at 150° C. for 10 minutes, and the sample was subjected to Raman spectrum measurement using a Raman microscope (produced by inVia Qontor, Renishaw plc.).

In the obtained Raman spectra, two peaks around 307 $cm^{-1}$ and 357 $cm^{-1}$ observed in the range of 245 $cm^{-1}$ to 420 $cm^{-1}$ were subjected to peak separation using this range as the baseline. The peak height of the peak observed around 300 to 340 $cm^{-1}$ with respect to the baseline was determined as the peak intensity A. Two peaks around 1,495 $cm^{-1}$ and 1,427 $cm^{-1}$ observed in the range of 1,400 to 1,600 $cm^{-1}$ were subjected to peak separation using this range as the baseline. The peak height of the peak observed around 1,450 to 1,550 $cm^{-1}$ with respect to the baseline was determined as the peak intensity B. The ratio (A/B) of the peak intensity A to the peak intensity B was then calculated, and average of the A/B and the standard deviation were also calculated. For the calculation of the average of the A/B and the standard deviation, the region of an acrylic resin was excluded, and only the region of the chlorinated polyvinyl chloride resin was used.

(2) Measurement of the Amount of Added Chlorine

The amount of added chlorine was measured for each of the obtained chlorinated polyvinyl chloride resins in conformity with JIS K 7229.

(3) Molecular Structure Analysis

The molecular structure of each of the obtained chlorinated polyvinyl chloride resins was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.
Apparatus: FT-NMRJEOLJNM-AL-300
Measured nuclei: 13C (proton complete decoupling)
Pulse width: 90° PD: 2.4 sec
Solvent: o-dichlorobenzene: deuterated benzene (C5D5) =3:1
Sample concentration: about 20%
Temperature: 110° C.
Reference material: central signal for benzene set to 128 ppm
Number of scans: 20,000

(4) Measurement of Sulfur Content of Chlorinated Polyvinyl Chloride Resin

An amount of 300 parts by mass of THE was added to 10 parts by mass of each of the obtained chlorinated polyvinyl chloride resins, stirred for 24 hours for dissolution, followed by further stirring in a centrifuge (produced by Kokusan Co., Ltd., H-200NR) at 14,000 rpm for 1 hour to precipitate insoluble components. The insoluble components were filtered out, and to the filtrate was added 1,000 parts by mass of methanol to reprecipitate the resin. While the resin was washed with methanol, suction filtration was performed using an aspirator (produced by AS ONE Corporation, GAS-IN) to separate the resin from the filtrate. In this manner, a sulfur-bound resin was obtained. The resin was put in a vacuum drier (produced by Tokyo Rikakikai Co., Ltd., VOS-451SD) and dried at 80° C. for 24 hours. Combustion IC was performed to detect CS bonds. The obtained sample is weighed in a ceramic boat, and then burned in an automatic sample combustion device. The generated gas is captured in 10 mL of an absorber liquid. This absorber liquid is adjusted to 15 mL with ultrapure water, and subjected to IC quantitative analysis. After a linear approximation of a $SO_4^{2-}$ anion calibration curve by measurement of a reference substance, the sample is measured to quantify the sulfur content (% by weight) of the chlorinated polyvinyl chloride resin.

The measurement conditions for the automatic combustion device are as follows.
  Device: AQF-2100H, produced by Mitsubishi Chemical Analytech
  Inlet temperature: 1,000° C.
  Outlet temperature: 1,100° C.
  Gas flow rate Oz: 400 mL/min
  Gas flow rate Ar: 200 mL/min
  Ar water supply unit: 100 mL/min
The conditions for IC are as follows.
  Device: ICS-5000, produced by Thermo Fisher Scientific
  Separation column: Dionex IonPac AS18-4 μm (2 mm×150 mm)
  Guard column: Dionex IonPac AG18-4 μm (2 mm×30 mm)
  Suppressor system: Dionex AERS-500 (external mode)
  Detector: conductivity detector
  Eluent: aqueous KOH solution (eluent generator EGC500)
  Eluent flow rate: 0.25 mL/min
  Sample injection volume: 100 μL
(5) Adhesion Evaluation
(Preparation of Pipe)

An amount of 4.0 parts by mass of an impact resistance modifier was added to 100 parts by mass of each of the obtained chlorinated polyvinyl chloride resins. Then, 0.5 parts by mass of a thermal stabilizer was added and mixed. The impact resistance modifier used was Kane Ace B-564 (produced by Kaneka Corporation, methyl methacrylate-butadiene-styrene copolymer). The thermal stabilizer used was TVS #1380 (produced by Nitto Kasei Co., Ltd., organotin stabilizer).

Further, 1.5 parts by mass of a polyethylene lubricant (produced by Mitsui Chemicals, Inc., Hiwax 220MP) and 0.2 parts by mass of a fatty acid ester lubricant (produced by Emery Oleochemicals Japan Ltd., LOXIOL G-32) were added. They were then uniformly mixed in a super mixer to prepare a chlorinated polyvinyl chloride resin composition.

The obtained chlorinated polyvinyl chloride resin composition was supplied to a conical counter-rotating twin screw extruder (produced by Osada Seisakusho, SLM-50) having a diameter of 50 mm and formed into pipes at a resin temperature of 200° C., each pipe having an outer diameter of 26.7 mm and a wall thickness of 2.4 mm.
(Preparation of Joint)

An amount of 5.0 parts by mass of an impact resistance modifier was added to 100 parts by mass of a chlorinated polyvinyl chloride resin (produced by Sekisui Chemical Co., Ltd., HA-24KL). Further, 3.0 parts by mass of a thermal stabilizer was added and mixed. The impact resistance modifier used was Kane Ace M-511 (produced by Kaneka Corporation, methyl methacrylate-butadiene-styrene copolymer). The thermal stabilizer used was TVS #1380 (produced by Nitto Kasei Co., Ltd., organotin stabilizer).

Further, 2.0 parts by mass of a polyethylene lubricant (produced by Mitsui Chemicals, Inc., Hiwax 220MP) and 0.3 parts by mass of a fatty acid ester lubricant (produced by Emery Oleochemicals Japan Ltd., LOXIOL G-32) were added. They were then uniformly mixed in a super mixer to prepare a chlorinated polyvinyl chloride resin composition.

The obtained chlorinated polyvinyl chloride resin composition was supplied to a conical counter-rotating twin screw extruder (produced by Osada Seisakusho, OSC-30) having a diameter of 30 mm and formed into pellets at a resin temperature of 190° C. The obtained pellets were supplied to an injection molding machine (produced by JSW, J350ADS) and formed into a socket having an outer diameter of 34.7 mm and an inner diameter of 26.9 mm.
(Preparation of Assembled Sample)

Two of the obtained pipes were cut to a length of 20 cm and bonded to the two ends of the obtained joint using an adhesive (produced by IPS, WELD-ON 724). The workpiece was then left to stand at 23° C. for 14 days, and left to stand in an oven (produced by Toyo Seiki Seisaku-Sho, Ltd., CO—O2) at 82° C. for 2 days, whereby an assembled sample was obtained.
(Adhesion Evaluation)

The inside of the obtained assembled sample was filled with water. The test was started by pressurizing the pipes to a hoop stress of 15.93 MPa using a hydrostatic pressure resistance tester (produced by IPT, 1662-0021) in an atmosphere adjusted to 65° C. with an oven. The time until a disconnection occurred between the pipe and joint to which the adhesive was applied was measured.

The adhesion was evaluated as "o" (Good) when no disconnection was observed after 1,000 hours from the start of the test, and evaluated as "x" (Poor) when a disconnection occurred by 1,000 hours. For the cases where a disconnection occurred by 1,000 hours, the time at which the disconnection occurred is shown in the table.
(6) Molded Article Strength Evaluation The presence or absence of cracks or fractures in the pipes and joint were determined after "(5) Adhesion evaluation", and the molded article strength was evaluated in accordance with the following criteria.
  o (Good): No crack or fracture was observed after 1,000 hours.
  Δ (Fair): Slight whitening was observed after 1,000 hours. No water leakage due to cracks or fractures was observed.
  x (Poor): Cracks or fractures were observed by 1,000 hours.
[Table 1]

|  |  |  |  | Example | | | |
|---|---|---|---|---|---|---|---|
|  |  |  |  | 1 | 2 | 3 | 4 |
| Production method | Raw material | Average degree of polymerization |  | 1000 | 1000 | 1000 | 1000 |
|  | PVC | Charge | kg | 50 | 50 | 50 | 50 |
|  | Water | Ion-exchanged water | kg | 130 | 130 | 130 | 130 |
|  | Chlorination: conditions | Reaction temperature | ° C. | 70 | 70 | 70 | 70 |
|  |  | Reaction pressure | Mpa | 0.04 | 0.04 | 0.04 | 0.04 |
|  |  | PVC + water | kg | 180 | 180 | 180 | 180 |
|  |  | Average chlorine consumption rate | kg/pvc-kg · 5 min | 0.02 | 0.012/ 0.007 | 0.012/ 0.007 | 0.012/ 0.007 |

-continued

| | | | | | | | |
|---|---|---|---|---|---|---|---|
| | | UV wavelength | nm | 365 | 365 | 365 | 365 |
| | | 200 ppm hydrogen peroxide | ppm/hr | — | — | — | — |
| | | Amount of 2-ethylhexyl thioglycolate added | parts by mass | 0.1 | 0.1 | 9.2 | 0.004 |
| | | Amount of isooctyl thioglycolate added | parts by mass | — | — | — | — |
| | | Amount of butanediol bisthioglycolate added | parts by mass | — | — | — | — |
| | Drying conditions | Drying temperature | °C. | 90 | 80 | 100 | 80 |
| | | Drying time | hr | 12 | 12 | 40 | 12 |
| Chlorinated polyvinyl chloride resin | | Amount of added chlorine | mass % | 9.5 | 12.7 | 10.7 | 10.7 |
| | Structure | Structural unit (b) —CH$_2$—CCl$_2$— | mol % | 24.2 | 29.4 | 22.5 | 23.1 |
| | Raman imaging spectroscopy | Peak intensity A/B | Average | 2.81 | 0.2 | 3.3 | 1.8 |
| | | | Standard deviation | 0.58 | 3.9 | 5.2 | 0.3 |
| | | (Average of A/B) + (Standard deviation of A/B)$^{1/2}$ | | 3.57 | 2.2 | 5.8 | 2.3 |
| | | (Amount of added chlorine)/(Average of A/B) | | 3.4 | 63.5 | 3.2 | 59 |
| | | (Average of A/B)/((Amount of added chlorine) × (Structural unit (b)) | | 0.0122 | 0.0005 | 0.0137 | 0.0073 |
| | | Sulfur content of resin (mass ppm) | | 14 | 21 | 182 | 13 |
| Evaluation | Adhesion | Disconnection | hr | 1000 | 1000 | 1000 | 1000 |
| | | Rating | | ○ | ○ | ○ | ○ |
| | Molded article strength | Rating | | ○ | ○ | ○ | ○ |

| | | | | Example | | | |
|---|---|---|---|---|---|---|---|
| | | | | 5 | 6 | 7 | 8 |
| Production method | Raw material | Average degree of polymerization | | 1000 | 700 | 1000 | 1000 |
| | PVC | Charge | kg | 50 | 50 | 50 | 50 |
| | Water | Ion-exchanged water | kg | 130 | 130 | 130 | 130 |
| | Chlorination: conditions | Reaction temperature | °C. | 70 | 70 | 70 | 70 |
| | | Reaction pressure | Mpa | 0.04 | 0.04 | 0.04 | 0.04 |
| | | PVC + water | kg | 180 | 180 | 180 | 180 |
| | | Average chlorine consumption rate | kg/pvc-kg · 5 min | 0.012/0.007 | 0 012/0.007 | 0.012/0.007 | 0.012/0.007 |
| | | UV wavelength | nm | 365 | 365 | 365 | 365 |
| | | 200 ppm hydrogen peroxide | ppm/hr | — | — | — | — |
| | | Amount of 2-ethylhexyl thioglycolate added | parts by mass | 4.8 | 1.5 | 1.5 | 0.04 |
| | | Amount of isooctyl thioglycolate added | parts by mass | — | — | — | — |
| | | Amount of butanediol bisthioglycolate added | parts by mass | — | — | — | — |
| | Drying conditions | Drying temperature | °C. | 80 | 80 | 80 | 65 |
| | | Drying time | hr | 12 | 12 | 12 | 40 |
| Chlorinated polyvinyl chloride resin | | Amount of added chlorine | mass % | 10.7 | 10.6 | 5.7 | 10.7 |
| | Structure | Structural unit (b) —CH$_2$—CCl$_2$— | mol % | 24.7 | 24.3 | 9.2 | 25.1 |
| | Raman imaging spectroscopy | Peak intensity A/B | Average | 2.4 | 1.2 | 3.4 | 2.3 |
| | | | Standard deviation | 0.4 | 0.3 | 0.6 | 0.2 |
| | | (Average of A/B) + (Standard deviation of A/B)$^{1/2}$ | | 3.0 | 1.7 | 4.2 | 2.7 |
| | | (Amount of added chlorine)/(Average of A/B) | | 4.5 | 8.8 | 1.7 | 4.7 |
| | | (Average of A/B)/((Amount of added chlorine) × (Structural unit (b)) | | 0.0091 | 0.0047 | 0.0648 | 0.0086 |
| | | Sulfur content of resin (mass ppm) | | 47 | 35 | 18 | 11 |
| Evaluation | Adhesion | Disconnection | hr | 1000 | 1000 | 1000 | 1000 |
| | | Rating | | ○ | ○ | ○ | ○ |
| | Molded article strength | Rating | | ○ | ○ | ○ | Δ |

| | | | | Example | | | |
|---|---|---|---|---|---|---|---|
| | | | | 9 | 10 | 11 | 12 |
| Production method | Raw material | Average degree of polymerization | | 1000 | 1000 | 1000 | 1000 |
| | PVC | Charge | kg | 50 | 50 | 50 | 50 |
| | Water | Ion-exchanged water | kg | 130 | 130 | 130 | 130 |

-continued

|  |  |  |  |  |  |  |  |
|---|---|---|---|---|---|---|---|
| | Chlorination: conditions | Reaction temperature | °C. | 70 | 70 | 70 | 50 |
| | | Reaction pressure | Mpa | 0.04 | 0.04 | 0.04 | 0.02 |
| | | PVC + water | kg | 180 | 180 | 180 | 180 |
| | | Average chlorine consumption rate | kg/pvc-kg · 5 min | 0.012/ 0.007 | 0.010/ 0.005 | 0.015/ 0.010 | 0 013/ 0.009 |
| | | UV wavelength | nm | 365 | 365 | 365 | 365 |
| | | 200 ppm hydrogen peroxide | ppm/hr | — | — | — | — |
| | | Amount of 2-ethylhexyl thioglycolate added | parts by mass | 0.002 | 0.04 | 0.003 | 0.04 |
| | | Amount of isooctyl thioglycolate added | parts by mass | — | — | — | — |
| | | Amount of butanediol bisthioglycolate added | parts by mass | — | — | — | — |
| | Drying conditions | Drying temperature | °C. | 100 | 80 | 80 | 80 |
| | | Drying time | hr | 7 | 12 | 12 | 12 |
| Chlorinated polyvinyl chloride resin | Amount of added chlorine | | mass % | 10.7 | 10.7 | 10.7 | 10.7 |
| | Structure | Structural unit (b) —$CH_2$—$CCl_2$— | mol % | 23.8 | 24.7 | 22.2 | 21.9 |
| | Raman imaging spectroscopy | Peak intensity A/B | Average | 0.8 | 3.1 | 0.2 | 0.3 |
| | | | Standard deviation | 5.3 | 0.3 | 6.9 | 1.1 |
| | | (Average of A/B) + (Standard deviation of A/B)$^{1/2}$ | | 3.1 | 3.6 | 2.8 | 1.3 |
| | | (Amount of added chlorine)/(Average of A/B) | | 13.4 | 3.5 | 53.5 | 35 7 |
| | | (Average of A/B)/((Amount of added chlorine) × (Structural unit (b))) | | 0.0031 | 0.0117 | 0.0008 | 0.0013 |
| | Sulfur content of resin (mass ppm) | | | 6 | 12 | 7 | 11 |
| Evaluation | Adhesion | Disconnection Rating | hr | 1000 ◯ | 1000 ◯ | 1000 ◯ | 1000 ◯ |
| | Molded article strength | Rating | | △ | ◯ | △ | ◯ |

| | | | | Example | | | |
|---|---|---|---|---|---|---|---|
| | | | | 13 | 14 | 15 | 16 |
| Production method | Raw material PVC | Average degree of polymerization | | 1000 | 1000 | 1000 | 1000 |
| | | Charge | kg | 50 | 50 | 50 | 50 |
| | Water | Ion-exchanged water | kg | 130 | 130 | 130 | 130 |
| | Chlorination: conditions | Reaction temperature | °C. | 80 | 70 | 70 | 70 |
| | | Reaction pressure | Mpa | 1.50 | 0.04 | 0.04 | 0.04 |
| | | PVC + water | kg | 180 | 180 | 180 | 180 |
| | | Average chlorine consumption rate | kg/pvc-kg · 5 min | 0.011/ 0.006 | 0.012/ 0.007 | 0.012/ 0.007 | 0 012/ 0.007 |
| | | UV wavelength | nm | 365 | 365 | 365 | 365 |
| | | 200 ppm hydrogen peroxide | ppm/hr | — | — | — | — |
| | | Amount of 2-ethylhexyl thioglycolate added | parts by mass | 0.005 | — | — | 8.8 |
| | | Amount of isooctyl thioglycolate added | parts by mass | — | 1.5 | — | — |
| | | Amount of butanediol bisthioglycolate added | parts by mass | — | — | 1.5 | — |
| | Drying conditions | Drying temperature | °C. | 80 | 80 | 80 | 100 |
| | | Drying time | hr | 12 | 12 | 12 | 45 |
| Chlorinated polyvinyl chloride resin | Amount of added chlorine | | mass % | 10.7 | 10.7 | 10.7 | 10.7 |
| | Structure | Structural unit (b) —$CH_2$—$CCl_2$— | mol % | 22.5 | 24.1 | 23.6 | 19.4 |
| | Raman imaging spectroscopy | Peak intensity A/B | Average | 1.3 | 1.0 | 0.8 | 3.4 |
| | | | Standard deviation | 7.1 | 0.4 | 0.6 | 4.1 |
| | | (Average of A/B) + (Standard deviation of A/B)$^{1/2}$ | | 4.0 | 1.6 | 1.6 | 5.4 |
| | | (Amount of added chlorine)/(Average of A/B) | | 8.2 | 10.7 | 13.4 | 3.1 |
| | | (Average of A/B)/((Amount of added chlorine) × (Structural unit (b))) | | 0.0054 | 0.0039 | 0.0032 | 0.0184 |
| | Sulfur content of resin (mass ppm) | | | 8 | 30 | 24 | 842 |
| Evaluation | Adhesion | Disconnection Rating | hr | 1000 ◯ | 1000 ◯ | 1000 ◯ | 1000 ◯ |
| | Molded article strength | Rating | | △ | ◯ | ◯ | ◯ |

-continued

|  |  |  |  | Comparative Example | | | |
|---|---|---|---|---|---|---|---|
|  |  |  |  | 1 | 2 | 3 | 4 |
| Production method | Raw material PVC | Average degree of polymerization | | 1000 | 1000 | 1000 | 1000 |
|  |  | Charge | kg | 50 | 50 | 50 | 50 |
|  | Water | Ion-exchanged water | kg | 130 | 130 | 130 | 130 |
|  | Chlorination: conditions | Reaction temperature | °C. | 140 | 85 | 50 | 140 |
|  |  | Reaction pressure | Mpa | 0.40 | 0.04 | 0.04 | 0.40 |
|  |  | PVC + water | kg | 180 | 180 | 180 | 180 |
|  |  | Average chlorine consumption rate | kg/pvc-kg · 5 min | 0.05 | 0.020/ 0.015 | 0.008/ 0.004 | 0.050/ 0.030 |
|  |  | UV wavelength | nm | — | 365 | 365 | — |
|  |  | 200 ppm hydrogen peroxide | ppm/hr | 15 | — | — | 15 |
|  |  | Amount of 2-ethylhexyl thioglycolate added | parts by mass | 0 | 11.2 | 0.0001 | 0 |
|  |  | Amount of isooctyl thioglycolate added | parts by mass | — | — | — | — |
|  |  | Amount of butanediol bisthioglycolate added | parts by mass | — | — | — | — |
|  | Drying conditions | Drying temperature | °C. | 90 | 100 | 55 | 80 |
|  |  | Drying time | hr | 12 | 5 | 50 | 12 |
| Chlorinated polyvinyl chloride resin |  | Amount of added chlorine | mass % | 9.5 | 10.7 | 10.7 | 10.7 |
|  | Structure | Structural unit (b) —CH$_2$—CCl$_2$— | mol % | 20.2 | 30.6 | 24.9 | 25.3 |
|  | Raman imaging spectroscopy | Peak intensity A/B | Average | 7.05 | 0.02 | 4.6 | 6.2 |
|  |  |  | Standard deviation | 0.08 | 11.2 | 0.4 | 0.2 |
|  |  | (Average of A/B) + (Standard deviation of A/B)$^{1/2}$ | | 7.3 | 3.4 | 5.2 | 6.6 |
|  |  | (Amount of added chlorine) (Average of A/B) | | 1.3 | 535 | 23 | 1.7 |
|  |  | (Average of A/B)/((Amount of added chlorine) × (Structural unit (b)) | | 0.0367 | 0.0001 | 0.02 | 0.02 |
|  |  | Sulfur content of resin (mass ppm) | | 0 | 105 | 0 | 0 |
| Evaluation | Adhesion | Disconnection | hr | 40 | 101 | 80 | 250 |
|  |  | Rating | | x | x | x | x |
|  | Molded article strength | Rating | | o | x | x | x |

INDUSTRIAL APPLICABILITY

The present invention can provide a chlorinated polyvinyl chloride resin that enables the production of a molded article that maintains high adhesion strength even when used in a form subjected to high pressure and is less susceptible to defects such as cracks due to insufficient strength, as well as a resin composition for molding and a molded article each including the chlorinated polyvinyl chloride resin.

The invention claimed is:

1. A chlorinated polyvinyl chloride resin having an average of a ratio (A/B) of a peak intensity A observed in a range of 300 to 340 cm$^{-1}$ to a peak intensity B observed in a range of 1,450 to 1,550 cm$^{-1}$ of 0.1 or more and 3.5 or less in Raman imaging measurement by Raman spectroscopy, having a sulfur content of 1 mass ppm or more and 1,000 mass ppm or less, and containing structural units (a) to (c) represented by the following formulas (a) to (c), wherein a proportion of the structural unit (b) is 40.0 mol % or lower relative to total number of moles of the structural units (a) to (c)

(a)

(b)

(c)

2. The chlorinated polyvinyl chloride resin according to claim 1, wherein a standard deviation of the ratio (A/B) of the peak intensity A to the peak intensity B is 0.10 to 10.0 in Raman imaging measurement by Raman spectroscopy.

3. A resin composition for molding, comprising the chlorinated polyvinyl chloride resin according to claim 1.

4. A molded article molded from the resin composition for molding according to claim 3.

* * * * *